Figure 1:
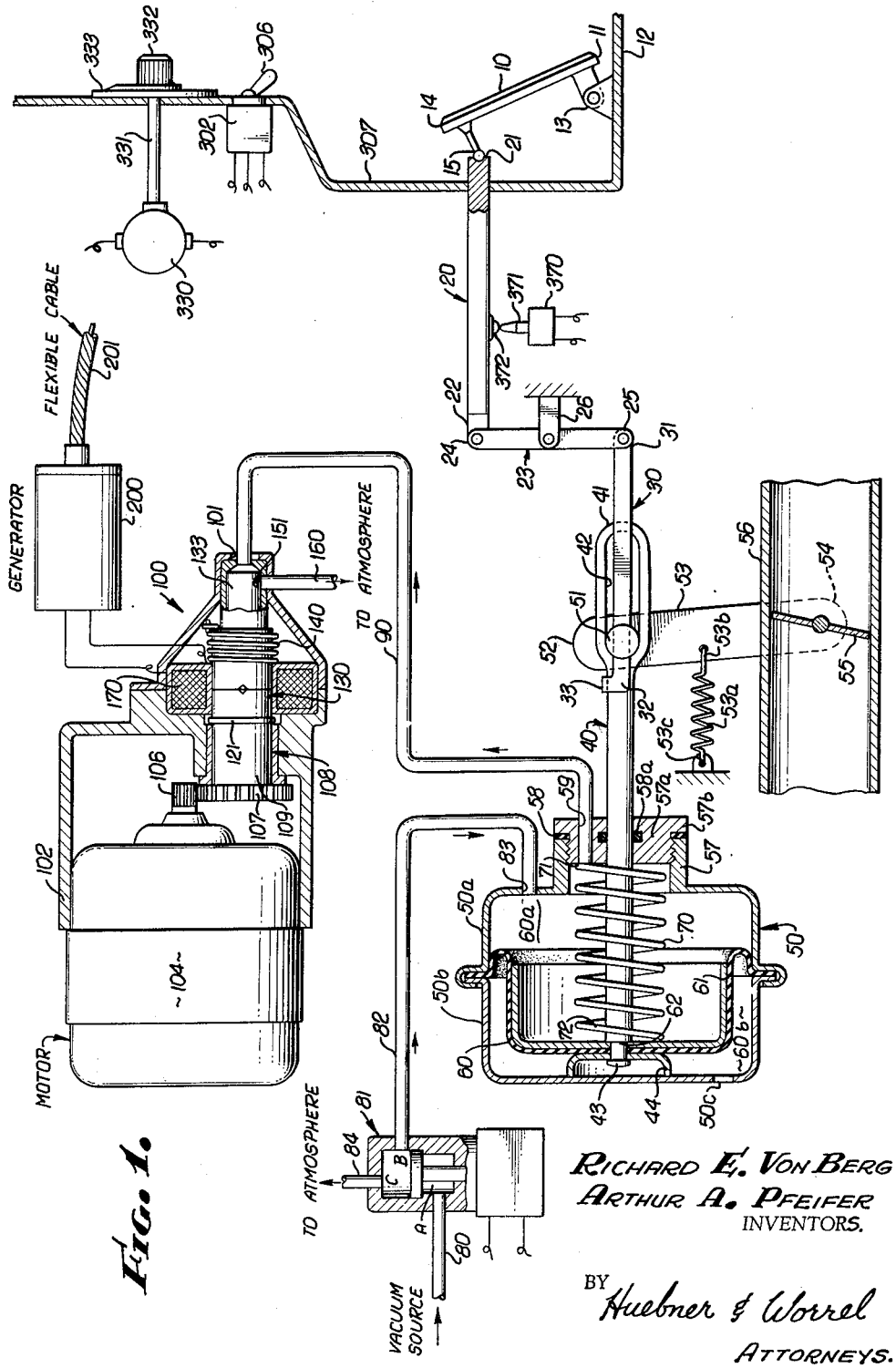

July 30, 1963  R. E. VON BERG ETAL  3,099,330
ELECTRICALLY OPERATED SPEED CONTROL DEVICE
Filed Jan. 22, 1962  3 Sheets-Sheet 1

RICHARD E. VON BERG
ARTHUR A. PFEIFER
INVENTORS.

BY Huebner & Worrel
ATTORNEYS.

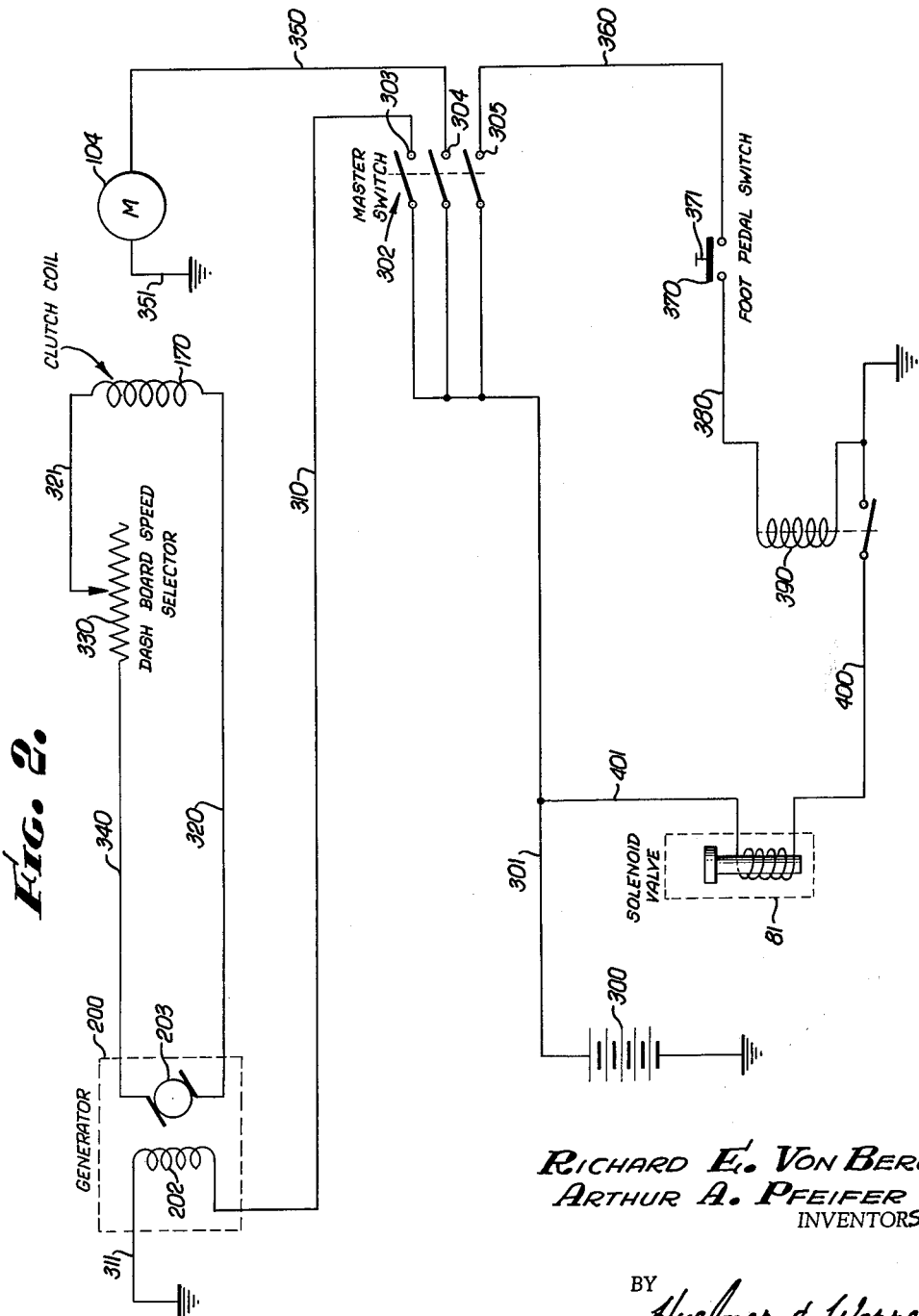

July 30, 1963   R. E. VON BERG ETAL   3,099,330
ELECTRICALLY OPERATED SPEED CONTROL DEVICE
Filed Jan. 22, 1962   3 Sheets-Sheet 3
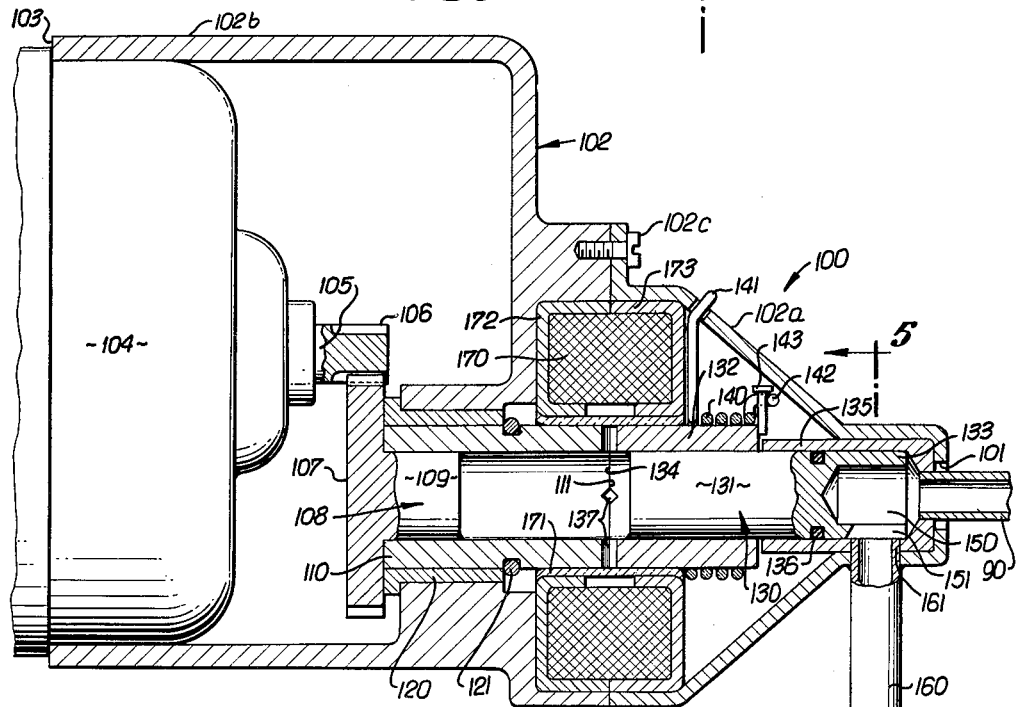
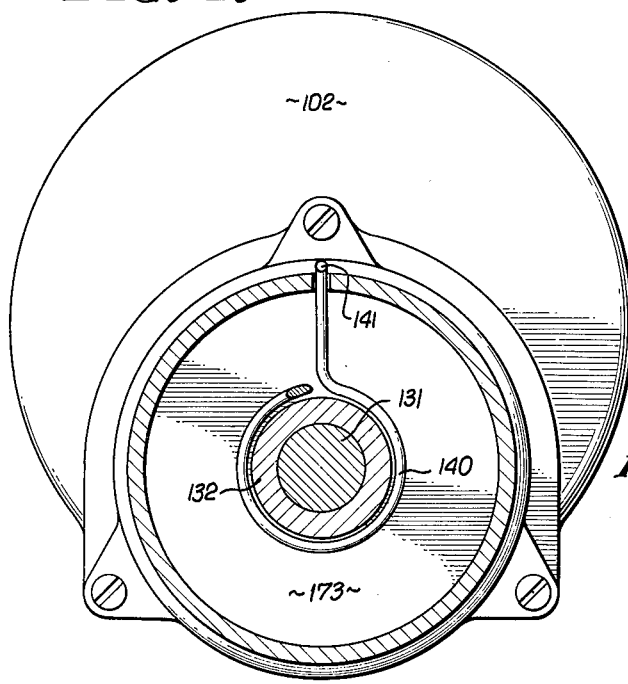
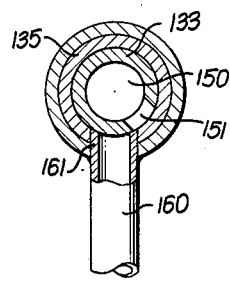
RICHARD E. VON BERG
ARTHUR A. PFEIFER
INVENTORS
BY
Huebner & Worrel
ATTORNEYS.

United States Patent Office 3,099,330
Patented July 30, 1963

3,099,330
ELECTRICALLY OPERATED SPEED CONTROL
DEVICE
Richard E. Von Berg, Santa Ana, and Arthur A. Pfeifer, Whittier, Calif., assignors to Rheem Manufacturing Company, New York, N.Y., a corporation of California
Filed Jan. 22, 1962, Ser. No. 167,500
22 Claims. (Cl. 180—82.1)

This invention relates to an electrically operated speed control device, and more particularly to a device for controlling engine speed of an automotive vehicle's internal combustion engine, relative to the vehicular speed, by means of a constant slip variable torque electric clutch. The device is also adaptable for use on a stationary internal combustion engine in which the device is activated by load changes on the stationary engine rather than by changes in vehicular speed.

Concerning the utilization of the device as a vehicular speed control device, in the operation of a modern automotive vehicle at sustained high speeds, as on open highways, it is often advantageous to automatically limit vehicular speed to a predetermined level, without requiring the constant attention of the operator of the vehicle to speed indications on the dashboard speedometer. It is an object of the present invention to provide a device which will accomplish that purpose and permit the driver of a motor vehicle to direct his attention constantly to more important driving condition.

Many speed control devices have been made and marketed, but all of them have operational limitations which restrict their effective use. It is therefore a further object of the present invention to provide a device which overcomes such limitations.

An example of an operational limitation present in other devices is that such devices are not capable of rapid adjustment to meet constantly changing road conditions, such as sharp upgrades and downgrades which impose rapid engine load changes, and under such conditions such other devices do not permit maintenance of vehicular speed with a substantial degree of accuracy. For instance, if a vehicle equipped with one of the older devices is traveling at a predetermined controlled speed on a level highway, reasonable vehicular speed control may be accomplished, but if such vehicle starts to climb a sharp upgrade, a load is added to the vehicle's engine, and the older device will not compensate sufficiently rapidly to prevent a substantial slowdown of the vehicle. Similarly, if a vehicle so equipped suddenly starts on a sharp downgrade, such older device will not quickly compensate to prevent a substantial rapid increase in vehicular speed.

It is therefore a more particular object of the present invention to provide a device which is capable of rapid, automatic adjustment to meet such changing road conditions and minimize or substantially eliminate changing vehicular speeds otherwise occurring. The device of the present invention will rapidly adjust to compensate for any such decreased and increased engine loads and minimize vehicular speed changes which would otherwise result therefrom.

A further object of the present invention is to provide a device which may be quickly rendered inoperative by "overriding" when it is desired to exceed the predetermined, set control speed, as when it is necessary to increase speed beyond the set speed in order to pass a slower moving vehicle or a partial highway obstruction. Contrasted with other devices, the device of the present invention can be quickly and easily "overridden" under such conditions, and will provide rapid return to controlled speed setting when the slower vehicle or obstruction has been passed. Therefore, it is still a further object of the present invention to provide a device which can be readily "overridden."

Similarly, when "underride" is desired to rapidly decrease vehicular speed from a set speed to meet a sudden emergency, the device of the present invention will permit such rapid deceleration.

Other speed control devices presently on the market are often excessively complicated, and it is another object of this invention to provide a device which is simple in design and construction, and consequently inexpensive to manufacture, install and operate, and which does not require mechanical adjustment after original installation.

It is yet another object of the present invention to provide such a device which is compact and may be easily installed without substantial modification of a vehicle's engine.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:
FIGURE 1 is a diagrammatic representation of the device of the present invention.
FIGURE 2 is a wiring diagram showing the electrical system of the device of the present invention.
FIGURE 3 is an enlarged vertical cross sectional view of the modulator of the device of the present invention.
FIGURE 4 is a view taken on the line 4—4 of FIGURE 3.
FIGURE 5 is a view taken on the line 5—5 of FIGURE 3.

As illustrated in the drawings, an accelerator pedal 10 is hinged adjacent one end 11 of said pedal 10 to any suitable base, such as the floor board 12 of an automotive vehicle, by any suitable means, such as a hinge mounting 13. Adjacent the other end 14 of said pedal 10 is a pivotal mounting 15, preferably a universal ball joint and link mounting such as that illustrated in FIGURE 1 of the drawings.

A rod 20 is operatively connected at one end 21 of rod 20 to said universal ball joint and link mounting 15. At or adjacent to the other end 22 of rod 20, a rocker arm 23 is pivotally connected, said rocker arm 23 being pivotally mounted intermediate one end 24 and another end 25 to a suitable base, such as the engine block (not shown) by any suitable means, such as by a bracket 26.

A rod 30 has an end 31 which is pivotally connected to rocker arm 23 at or adjacent to end 25 of rocker arm 23. Rod 30 has another end 32, at which a flange 33 is formed.

An actuator rod 40 is disposed in extended relationship with rod 30. Actuator rod 40 has an end 41, at which an elongate slotted opening 42 is formed. The other end 43 of actuator rod 40 is slidably disposed in a diaphragm actuator or cylinder 50, hereinafter described in detail. Suitably mounted at end 43 of actuator rod 40 is a cup 44, which acts as an extended stop, as hereinafter mentioned.

Slidably disposed in the elongate slotted opening 42 of actuator rod 40 is a shank 51, said shank 51 being mounted at one end thereof at or adjacent to an end 52 of lever arm 53. The other end 54 of lever arm 53 is operatively connected to a fuel input means, such as a flow valve or butterfly valve 55 of a carburetor 56.

A tension spring 53a may be mounted at one end 53b thereof on lever arm 53, intermediate the ends 52 and 54 of said lever arm 53, said tension spring 53a being anchored at its other end 53c to any stationary object, such as the engine block, said spring 53a being disposed so that, by the action on lever arm 53, butterfly valve 55 may be biased to a normally closed position in carburetor 56.

Diaphragm actuator 50, for purposes of convenience in assembly, is preferably formed of two sections, a forward housing 50a, and a rear housing 50b. An open port 50c is provided in rear housing 50b. Forward housing 50a has a protruding collar 57, which is internally threaded. A nut, or fitting 57a is externally threaded for threadable engagement with said collar 57, and has a flanged head 57b designed to seat on collar 57. A gasket 58 may be disposed between said flanged head 57b and said collar 57.

Fitting 57a is axially bored to slidably receive actuator rod 40, and an O-ring 58a may be provided in said bore to maintain the vacuum in diaphragm actuator 50, in the manner hereinafter described. Fitting 57a has a second bore forming a port 59, providing access to the interior of diaphragm actuator 50. A diaphragm 60 is transversely mounted in diaphragm actuator 50. Diaphragm 60 is a rolling type of diaphragm.

As illustrated in FIGURE 1 of the drawings, a satisfactory method of joining forward housing 50a and rear housing 50b, and at the same time mounting diaphragm 60 in diaphragm actuator 50, is to lap the edge of forward housing 50a over the edge of rear housing 50b, and disposing the edge of diaphragm 60 therebetween, so as to form an air-tight seal. When so mounted, diaphragm 60 defines a vacuum chamber 60a in forward housing 50a and a chamber 60b in rear housing 50b, said chamber 60b having access to the atmosphere by way of port 50c.

A second cup 61 is disposed in diaphragm actuator 53. Cup 61 faces in the opposite direction from first cup 44, and is of sufficient size and configuration to shape diaphragm 60 and maintain diaphragm 60 in rolling position, as illustrated in FIGURE 1 of the drawings.

Diaphragm 60 is disposed between first cup 44 and second cup 61. Actuator rod 40 passes through an axial bore in cup 61 and diaphragm 60, and cup 44, diaphragm 60 and cup 61 are joined and secured together by actuator rod 40, as by being disposed in a tight groove 62 adjacent end 43 of actuator rod 40.

A compression spring 70 is disposed in diaphragm actuator 50, and actuator rod 40 passes through said compression spring 70. One end 71 of compression spring 70 is seated on fitting 57a, and the other end 72 of compression spring 70 is seated on cup 61.

A first vacuum conduit 80 leads from a standard vacuum source (not shown) to a first port A in a by-pass solenoid valve 81. A second vacuum conduit 82 leads from a second port B in said solenoid valve 81 to a port 83 in forward housing 50a of diaphragm actuator 50, thus providing vacuum access to the interior of diaphragm actuator 50. An open-ended bleed-off line 84 leads from a port C in solenoid valve 81 and provides vacuum discharge to the atmosphere.

A third vacuum conduit 90 leads from port 59 in fitting 57a to a modulator 100, hereinafter described in detail, and more particularly to a port 101 in said modulator 100.

Modulator 100 is illustrated in detail in FIGURES 3–5 of the drawings, from which it will be seen that modulator 100 has a housing 102, said housing 102 having an open end 103 opposite the end of modulator 100 at which port 101 is located. Disposed in said open end 103 of housing 102 is a constant speed electric motor 104, which preferably is a 12 volt D.C. motor. A drive shaft 105 of motor 104 is geared at its free end 106, and said geared end 106 of shaft 105 projects inwardly in housing 102. Housing 102, for purposes of convenience in manufacture, may consist of two portions, 102a and 102b, suitably connected by any desirable means, such as bolts 102c.

Meshing with gear shaft 105 is a gear 107, centrally secured to which is an armature 108. Armature 108 has a center spindle member 109 and an outside circumferential member 110. It also has an abutting end face 111. A bearing 120, itself supported by housing 102, rotatably supports gear 107 and armature 108 mounted thereon. A retaining ring 121 is disposed so as to prevent longitudinal movement of the assembly of armature 108 and gear 107, while permitting free rotational movement thereof.

Aligned within housing 102 with armature 108 is a second armature 130 having an extending center spindle member 131 and an outside circumferential member 132. Extending end 133 of center member 131 forms a rotary valve sleeve (hereinafter described in more detail). Armature 130 has an abutting end face 134. A bearing 135, itself supported by housing 102, rotatably supports armature 130. An O-ring may be provided on rotary valve sleeve 133. Armature 130, contrasted with armature 108, is free to move longitudinally. By way of illustration, but not by way of limitation, it is preferred that longitudinal movement of armature 130 be restricted to .010 inch.

Rotation of armature 130 is restricted by a spring 140, circumferentially mounted about armature 130 and secured at one end 141 of said spring 140 to housing 102. At its other end 142, spring 140 abuts upon suitable stop means, such as stud 143 mounted on armature 130 and best illustrated in FIGURE 3 of the drawings.

It is preferred that a plurality of grooves or notches 137 be formed at the circumferential edges of faces 111 and 134 of armatures 108 and 130, respectively, the purpose of said such grooves or notches being to prevent any entrapment of air therebetween when armature faces 111 and 134 are being brought into contact with each other, as hereinafter described.

Formed in rotary sleeve 133 is an open-ended chamber 150, the open end of said chamber 150 being in communication with port 101. Formed laterally in chamber 150 is a port 151, which is disposed so as to selectively communicate, or not communicate, with a bleed-off line 160 upon rotation of armature 130, said bleed-off line 160 having one end 161 thereof disposed in an aligned bore through housing 102 and bearing 135, thus being available for selective communication with port 151.

A clutch coil 170 is circumferentially mounted around armatures 108 and 130, adjacent their abutting end surfaces 111 and 134, respectively, said abutting end surfaces 111 and 134 being rotatably disposed in a sleeve 171, said sleeve 171 being preferably of brass, and mounted in a bore in coil 170. Sleeve 171 acts as a bushing for armatures 108 and 130. Coil 170 is encased in a shell which, for purposes of convenience of the manufacturer, may comprise two shell sections 172 and 173, suitably joined together. Coil 170 is suitably supported in housing 102.

A two-pole generator 200 is electrically connected, in the manner hereinafter described, to coil 170. Generator 200 is rotatably activated by a flexible drive cable 201, said cable 201 being suitably attached to the transmission of the vehicle (not shown).

As best illustrated in FIGURE 2 of the drawings, a source of electric power, such as a 12-volt battery 300, furnishes power for motor 104, and also is electrically connected by a line 301 to a three-pole, single-throw, master switch 302, having poles 303, 304 and 305. Master switch 302 has a throw-arm 306 which may be suitably accessibly mounted on, say, the dashboard 307 of the automotive vehicle (as shown in FIGURE 1 of the drawings). Pole 303 of master switch 302 has a line 310 leading from pole 303 to field circuit 202 of generator 200. A line 311 leads from field circuit 202 to a suitable ground.

A line 320 leads from an armature 203 of generator 200 to coil 170. A second line 321 leads from coil 170 to a rheostat or dashboard speed selector 330. Rheostat 330 may be selectively regulated by any suitable means, such as an operating rod 331 which is connected to a dial knob 332, mounted in association with a dial speed indicator 333, in turn mounted in readily accessible position on dashboard 307.

A line 340 leads from generator armature 203 to said rheostat-dashboard speed selector 330.

A line 350 leads from pole 304 of master switch 302 to motor 104, and a second line 351 leads from motor 104 to a suitable ground.

A line 360 leads from pole 305 of master switch 302 to one side of a foot pedal switch 370.

Foot pedal switch 370 is normally open, and is controlled by a plunger 371. A detent 372 (as best illustrated in FIGURE 1) is mounted on rod 20 and disposed so as to make abutting contact with plunger 371 of switch 370, and thus selectively close switch 370 when predetermined pressure is applied to pedal 10. A line 380 leads from switch 370 to a latching relay 390, which is suitably grounded.

A line 400 leads from latching relay 390 to solenoid 81, and a second line 401 leads from solenoid 81 to a spliced engagement with line 301 intermediate battery 300 and master switch 302.

In operation, when throw arm 306 on master switch 302 is in the "off" position, no electric current will flow through the system, the device of the present invention will be inoperative, and the vehicle will be under the usual manual control of the operator.

The operator may then select any desired speed and turn dial knob 332 to the selected speed on speed indicator 333. If throw-arm 306 on master switch 302 is then moved to "on" position to close master switch 302, and if the operator applies slight pressure on foot pedal 10 so as to bring detent 372 into contact with plunger 371 of switch 370, switch 370 will close, the electric circuit of the device of the present invention will be completed, and the device will effectively control vehicular speed at the selected speed, in the manner hereinafter described.

If the operator removes said pressure on pedal 10, so that an "underride" condition prevails, switch 370 will open, and the electric circuit of the device will be broken, so that the device of the present invention will be rendered inoperable to control vehicular speed, returning the operation of the vehicle to manual control.

Similarly, if the operator exerts greater pressure on foot pedal 10 than that required to hold detent 372 in contact with plunger 371, so that an "override" condition prevails, switch 370 will open, the electric circuit will be broken, so that, under these conditions as well, the device will be rendered inoperable to control vehicular speed, again leaving the operation of the vehicle to manual control.

When the motor vehicle is parked and the internal combustion engine is not operating, of course the device of the present invention will be in static condition.

When the internal combustion engine is idling, but the motor vehicle is not moving, master switch 302 is open, and control switch 370 is also open. Consequently, the electric circuit of the device of the present invention is not complete, and the device will not be fully operative. More particularly, generator 200 will not be rotating, because flexible cable 201, which serves to rotate generator 200, will not be energized by the motor vehicle transmission because the vehicle is not moving. However, under these conditions, vacuum may be present in vacuum conduit 80, but solenoid valve 81 will not be energized, because the electric circuit is incomplete. Consequently, solenoid valve 81, being a three-way normally closed valve, will prevent passage of vacuum to the system, and from port C any vacuum present in chamber 60a will pass through line 82 and will bleed off through bleed-off line 84 to the atmosphere.

If the operator of the motor vehicle desires to operate the motor vehicle under manual control, without using the speed control of the device of the present invention, he leaves master switch 302 open. Therefore, although the vehicle may be moving, causing cable 201 to rotate generator 200, master switch 302 being open, no electric current will flow to generator 200, to motor 104, or to solenoid valve 81, by way of relay 390, even if the operator, by pressure on pedal 10, has made contact between detent 372 and plunger 371 to close control switch 370. Again, vacuum in conduit 80 will pass to the system, but vacuum in chamber 60a will pass through line 82 and will bleed off through bleed-off line 84 to the atmosphere.

When the vehicle is being operated under manual control, operation of pedal 10 will seriatim move rod 20, rocker arm 23, lever arm 53, and butterfly valve 55 of carburetor 56, by the mechanical linkage best illustrated in FIGURE 1, and acceleration of the motor vehicle will thus be controlled and operated.

If the vehicle is moving forward at, say, 30 m.p.h., under manual control, and the operator of the vehicle then desires to proceed at a controlled vehicle speed of say, 45 m.p.h., the operator will turn dial knob 332 until a vehicular speed of 45 m.p.h. is indicated on dial 333, and will then move throw-arm 306 of master switch 302 to the "on" or closed position.

The operator will then either ease up on pressure being applied by him to pedal 10, or increase said pressure (depending on the position of detent 372 relative to plunger 371), until detent 372 is in contact with plunger 371, and control switch 370 is closed.

Electric circuit to generator 200 will now be complete and the generator field of generator 200 will be excited to produce an electric output from generator 200 to coil 170, and the setting of rheostat switch selector 330, by manipulation of dial knob 332 and rod 331, will introduce a fixed amount of resistance into the circuit of clutch coil 170. Furthermore, motor 104 will be operating. Latch relay 390 will also be energized to close its contact and permit the energizing of solenoid valve 81.

With normally closed solenoid valve 81 now energized and open, vacuum communication between ports A and B of solenoid valve 81 is attained (whereas, port C of solenoid valve 81 is closed).

With vacuum communication established between ports A and B of solenoid valve 81, a vacuum is created in conduit 82, in vacuum chamber 60a of actuator 50, and in conduit 90. If the vehicle is then traveling at 30 m.p.h., or just slightly above 30 m.p.h., and the rheostat speed selector has been set for 45 m.p.h., very little current will be flowing in clutch coil 170. Consequently, the magnetic flux is weak, and there is little or no friction between faces 111 and 134 of armatures 108 and 130, respectively. As a result, armature 130, restrained by spring 140, will hold port 151 out of communication with line 160, so that vacuum can build up in chamber 60a of actuator 50.

As vacuum in vacuum chamber 60a of actuator 50 increases, diaphragm 60 will be caused to move to the right, in turn moving actuator rod 40 to the right, thus actuating lever arm 53 and opening butterfly valve 55 to increase throttle.

As the speed of the vehicle accelerates toward the selected speed of 45 m.p.h., the r.p.m. of generator 200, actuated by cable 201 connected to the transmission, will also increase, resulting in an increased current flow from generator 200 to clutch coil 170. As current increases in clutch coil 170, magnetic flux will also increase, thereby causing increased friction between faces 111 and 134 of armatures 108 and 130, respectively. Because armature 108, driven by motor 104, is rotating, armature 130 will then be caused to rotate, permitting port 151 of chamber 150 to come into communication with line 160.

More particularly describing the operation of modulator 100, the degree of communication between chamber 150 through port 151 to vacuum bleed-off line 160 is controlled by magnetic attraction between armatures 108 and 130 and friction between faces 111 and 134 of armatures 108 and 130, respectively.

Armature 130 is in continuous slip. The amount of slip or rotational torque of armature 130 is controlled by the friction between faces 111 and 134 of armatures 108 and 130, respectively, and this friction is controlled by the magnetic field which is set up. As magnetic attraction increases, the air gap between armatures 108 and 130 is cut down until it is reduced to zero, at which point armatures 108 and 130 are in physical contact with each other. With armature 108 already rotating, armature 130 will rotate, restrained by spring 140. The rotational force applied to armature 130 is proportional to the friction between armatures 108 and 130, which is a consequence of the strength of the magnetic field created. As the magnetic field strength is increased by the increased current flow from generator 200 to coil 170, said friction between armatures 108 and 130 is increased, and a greater rotating force is exerted on armature 130. Consequently, bleed-off communication through line 160 will increase. Likewise, as the strength of the magnetic field is decreased, friction will decrease, and the action of spring 140 will move armature in a direction opposite to the frictional drag until the spring force is equal to the rotating torque, slackening and finally closing vacuum communication between chamber 150 and vacuum bleed-off line 160.

As the communication between port 151 and line 160 increases, vacuum in the system will increasingly decay. As vacuum decays, the movement of diaphragms 60 of actuator 50 to the right will be slowed and finally stopped, and consequently, the movement of actuator rod 40 will first be slowed and then stopped, the stoppage occurring when the vehicle has reached the set speed of 45 m.p.h.

When the vehicle is proceeding at the set speed of 45 m.p.h., the output of generator 200, flowing through the fixed resistance in rheostat speed selector 330, will establish a definite magnetic field in coil 170, resulting in the creation of a definite amount of friction between faces 111 and 134 of armatures 108 and 130, respectively, causing a definite fixed amount of rotation of armature 130, in turn resulting in a fixed amount of communication between chamber 150 and port 151 to line 160, and thence to the atmosphere. The bleed-off of vacuum through line 160 will maintain the required throttle position of butterfly valve 55 to maintain the set speed, and the entire system of the device of the present invention will be in balance. An indicated change in vehicular speed, such as would occur when a sharp upgrade or a sharp downgrade is encountered, will upset this balance, causing either a decreased or increased rotation of armature 130, and consequently an increased or decreased communication between chamber 150 through port 151 to bleed-off line 160, resulting in a change in throttle.

When vehicular speed commences to exceed set speed, increased r.p.m. of generator 200, acting on coil 170, will further increase magnetic flux, and increased friction between faces 111 and 134 of armatures 108 and 130, respectively, will occur, in turn causing larger communication between port 151 of chamber 150 and line 160. Increased bleed-off, resulting in increased vacuum decay in chamber 60a of actuator 50 will cause diaphragm 60, impelled by spring 70, to move to the left, the movement to the left being arrested when cup 44 comes in contact with rear housing 50b. As diaphragm 60 moves to the left, drawing actuator rod 40 with it, through the mechanical linkage shown, butterfly valve 55 will move to de-throttle position in carburetor 56.

The relatively rapid reactions of the electric elements of the device of the present invention, and their relatively rapid action on the vacuum system and the bleed-off of vacuum, will prevent "over-shooting" often present in other speed control devices, so that vehicular speed will not, under any circumstances, substantially exceed the selected speed. Such rapid reactions will also maintain the set speed and will further prevent substantial "under-shooting" often caused in other speed control devices by changing road conditions such as suddenly encountered, sharp upgrades.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and devices.

What is claimed is:

1. An electrically operated device for adjustably controlling the speed of operation of an internal combustion engine which comprises: a generator having its speed controlled by drive means related to the load change factor of an internal combustion engine; an electric motor; a constant slip variable torque electric clutch energized by said generator and operatively connected to said motor; a vacuum chamber connected to said clutch and disposed so as to be rotated by said clutch; an egress port in said vacuum chamber; a bleed-off line disposed so as to be, selectively, in and out of contact with said egress port upon rotation of said vacuum chamber; an actuator chamber; a diaphragm transversely disposed in said actuator chamber so as to be actuated by vacuum in said actuator chamber; means for selectively introducing vacuum into said actuator chamber; a vacuum conduit leading from said actuator chamber to said vacuum chamber; an actuator rod connected to said diaphragm adjacent one end of said rod; a carburetor; a flow valve mounted in said carburetor; and means connected to said actuator rod and to said flow valve for operating said flow valve upon reciprocal movement of said actuator rod.

2. An electrically operated device for adjustably controlling the speed of operation of an internal combustion engine, as defined in claim 1, wherein said clutch is connected to said motor by a gear train.

3. An electrically operated device for adjustably controlling the speed of operation of an internal combustion engine, as defined in claim 1, wherein said means for selectively introducing vacuum into said actuator chamber, comprises: a solenoid valve connected to a vacuum source; and a conduit leading from said solenoid valve to said actuator chamber.

4. An electrically operated device for adjustably controlling the speed of operation of an internal combustion engine, as defined in claim 3, including bleed-off means connected to said solenoid valve.

5. An electrically operated device for adjustably controlling the speed of operation of an internal combustion engine by means of a constant slip variable torque electric clutch which comprises: a generator having its speed controlled by drive means related to the load factor of an internal combustion engine; an electric motor; a constant slip variable torque electric clutch energized by said generator and operatively connected to said motor; a vacuum chamber connected to said clutch and disposed so as to rotated by said clutch; an egress port in said vacuum chamber; a bleed-off line disposed so as to be, selectively, in and out of contact with said egress port upon rotation of said vacuum chamber; an actuator chamber; a diaphragm transversely disposed in said actuator chamber so as to be actuated by vacuum in said actuator chamber; solenoid valve means for selectively introducing vacuum into said actuator chamber; a vacuum conduit leading from said actuator chamber to said vacuum chamber; an actuator rod; adjustable fuel input means on said engine; and means connected to said actuator rod and to said fuel input means for adjusting said fuel input means upon reciprocal movement of said actuator rod.

6. An electrically operated device for adjustably controlling the speed of operation of an internal combustion engine by means of a constant slip variable torque electric clutch, as defined in claim 5, wherein said constant slip variable torque electric clutch comprises: a first rotatable armature driven by said motor and secured against axial movement, said first armature having an end face; a rotatable second armature axially aligned with said first armature and having an end face disposed so as to abut on the end face of said first armature; and a coil circumferentially mounted around the abutting faces of said first and second armatures, said coil being energized by said generator so as to set up a magnetic field between said first and second armatures.

7. An electrically operated device for adjustably controlling the speed of operation of an internal combustion engine by means of a constant slip variable torque electric clutch, as defined in claim 6, including means for restricting the rotational movement of said second armature.

8. An electrically operated device for adjustably controlling the speed of operation of an internal combustion engine by means of a constant slip variable torque electric clutch, as defined in claim 7, wherein said means for restricting the rotational movement of said second armature comprises: a spring circumferentially mounted about said second armature; and stop means on said second armature; said spring having one end secured to a suitable base and the other end disposed so as to abut on said stop means.

9. An electrically operated device for adjustably controlling the speed of operation of an internal combustion engine of an automotive vehicle, which comprises: a source of electric power; a generator having its speed controlled by drive means related to the vehicular speed of the automotive vehicle, and said generator having a field winding connected to said source of electric power so as to excite said field; an electric motor connected to said source of electric power; a first rotatable armature driven by said motor and secured against axial movement, said first armature having an end face; a rotatable second armature axially aligned with said first armature and having an end face disposed so as to abut on the end face of said first armature; a coil circumferentially mounted around the abutting faces of said first and second armatures, said coil being energized by said generator so as to set up a magnetic field between said first and second armatures; means for restricting the rotational movement of said second armature; a vacuum chamber connected to said second armature and disposed so as to be rotated by said second armature; an egress port in said vacuum chamber; a bleed-off line disposed so as to be, selectively, in and out of contact with said egress port upon rotation of said vacuum chamber; an actuator chamber; a diaphragm transversely disposed in said actuator chamber so as to be actuated by vacuum in said actuator chamber; means for selectively introducing vacuum into said actuator chamber; a vacuum conduit leading from said actuator chamber to said vacuum chamber; an actuator rod connected to said diaphragm adjacent one end of said rod; a carburetor; a flow valve mounted in said carburetor; and means connected to said actuator rod and to said flow valve for operating said flow valve upon reciprocal movement of said actuator rod.

10. An electrically operated device for adjustably controlling the speed of operation of an internal combustion engine of an automotive vehicle, as defined in claim 9, wherein said means for selectively introducing vacuum into said actuator chamber comprises a by-pass solenoid valve energized by said source of electric power and connected to a vacuum source; a conduit leading from said solenoid valve to said actuator chamber; and a vacuum bleed-off line leading from said solenoid valve to the atmosphere.

11. An electrically operated device for adjustably controlling the speed of operation of an internal combustion engine of an automotive vehicle, as defined in claim 9, including: a rheostat electrically connected to said source of electric power and to said generator and clutch coil.

12. An electrically operated device for adjustably controlling the speed of operation of an internal combustion engine of an automotive vehicle, as defined in claim 9, including: a master switch disposed so as to selectively open and close electric circuit connections between said source of electric power, said generator, said coil, and said solenoid valve.

13. An electrically operated device for adjustably controlling the speed of operation of an internal combustion engine of an automotive vehicle, as defined in claim 9, including: an electric throttle switch disposed between said source of electric power and said solenoid valve so as to selectively open and close the electric connection between said source of electric power and said solenoid valve.

14. An electrically operated device for adjustably controlling the speed of operation of an internal combustion engine of an automotive vehicle, as defined in claim 13, including: an accelerator pedal; and means associated with said accelerator pedal to open and close said throttle switch.

15. An electrically operated device for adjustably controlling the speed of operation of an internal combustion engine of an automotive vehicle, as defined in claim 14, including: means connected to said accelerator pedal and said flow valve for selectively operating said flow valve when said throttle switch is open.

16. An electrically operated device for adjustably controlling the speed of operation of an internal combustion engine of an automotive vehicle, which comprises: a source of electric power; a generator having its speed controlled by drive means related to the vehicular speed of the automotive vehicle, and said generator having a field winding connected to said source of electric power so as to excite said field; a constant speed electric motor connected to said source of electric power; a first rotatable armature driven by said motor and secured against axial movement, said first armature having an end face; a rotatable second armature axially aligned with said first armature and having an end face disposed so as to abut on the end face of said first armature; a coil circumferentially mounted around the abutting faces of said first and second armatures, said coil being energized by said generator so as to set up a magnetic field between said first and second armatures; means for restricting the rotational movement of said second armature; a vacuum chamber connected to said second armature and disposed so as to rotated by said second armature; an egress port in said vacuum chamber; a bleed-off line disposed so as to be, selectively, in and out of contact with said egress port upon rotation of said vacuum chamber; an actuator chamber; a diaphragm transversely disposed in said actuator chamber so as to be actuated by vacuum in said actuator chamber; a vacuum source; a three-port by-pass solenoid valve energized by said source of electric power and connected to said vacuum source through one of its ports; a vacuum bleed-off line connected to another of said solenoid valve ports; a vacuum conduit leading from the third of said solenoid valve ports to said actuator chamber; a vacuum conduit leading from said actuator chamber to said vacuum chamber; an actuator rod connected to said diaphragm adjacent one end of said rod; a carburetor; a flow valve mounted in said carburetor; means connected to said actuator rod and to said flow valve for operating said flow valve upon reciprocal movement of said actuator rod; an accelerator pedal; and means connected to said accelerator pedal and to said flow valve for operating said flow valve upon movement of said accelerator pedal when said source of electric power is disconnected.

17. An electrically operated device for adjustably controlling the speed of operation of an internal combustion engine of an automotive vehicle, as defined in claim 16, wherein the means connected to said actuator rod and to said flow valve for operating said flow valve upon reciprocal movement of said actuator rod is a lever arm, said lever arm being mounted adjacent one end of said lever arm to said actuator rod and adjacent the other end of said lever arm to said flow valve.

18. An electrically operated device for adjustably controlling the speed of operation of an internal combustion engine of an automotive vehicle, as defined in claim 17, including means biasing said lever arm and flow valve to a closed position of said flow valve.

19. An electrically operated device for adjustably controlling the speed of operation of an internal combustion engine of an automotive vehicle, as defined in claim 17, wherein said lever arm is selectively engageably and disengageably connected to said actuator rod.

20. An electrically operated device for adjustably controlling the speed of operation of an internal combustion engine of an automotive vehicle, as defined in claim 19, including means mounted on said lever arm for operating said lever arm upon movement of said accelerator pedal when said lever arm is disengaged from said actuator rod.

21. An electrically operated device for adjustably controlling the speed of operation of an internal combustion engine of an automotive vehicle, which comprises: a source of electric power; a generator having its speed controlled by drive means related to the vehicular speed of of the automotive vehicle, and said generator having a field winding connected to said source of electric power so as to excite said field; a constant speed electric motor connected to said source of electric power; a first rotatable armature driven by said motor and secured against axial movement, said first armature having an end face; a rotatable second armature axially aligned with said first armature and having an end face disposed so as to abut on the end face of said first armature; a coil circumferentially mounted the abutting faces of said first and second armatures, said coil being energized by said generator so as to set up a magnetic field between said first and second armatures; means for restricting the rotational movement of said second armature; a vacuum chamber connected to said second armature and disposed so as to be rotated by said second armature; an egress port in said vacuum chamber; a bleed-off line disposed so as to be, selectively, in and out of contact with said egress port upon rotation of said vacuum chamber; an actuator chamber; a diaphragm transversely disposed in said actuator chamber so as to be actuated by vacuum in said actuator chamber; a vacuum source; a three-port by-pass solenoid valve energized by said source of electric power and connected to said vacuum source through one of its ports; a vacuum bleed-off line connected to another of said solenoid valve ports; a vacuum conduit leading from the third of said solenoid valve ports to said actuator chamber; a vacuum conduit leading from said actuator chamber to said vacuum chamber; an actuator rod connected to said diaphragm adjacent one end of said rod, said actuator rod being spring-biased so as to resist vacuum in said actuator chamber; adjustable fuel input means for said internal combustion engine; means connected to said actuator rod and to said fuel input means for adjusting said fuel input means upon reciprocal movement of said actuator rod; an accelerator pedal; an electric throttle switch connected to said accelerator pedal and to said solenoid valve; and means associated with said accelerator pedal for opening and closing said throttle switch.

22. An electrically operated device for adjustably controlling the speed of operation of an internal combustion engine of an automotive vehicle, as defined in claim 21, wherein the means for opening and closing said throttle switch comprises: a rod pivotally connected to said accelerator pedal and to said fuel input means; a detent mounted on said rod; and a plunger mounted on said throttle switch and disposed so as to be depressed by contact with said detent to close said throttle switch.

References Cited in the file of this patent
UNITED STATES PATENTS

| | | |
|---|---|---|
| 2,708,979 | Reynoldson | May 24, 1955 |
| 2,948,271 | Ignatjev | Aug. 9, 1960 |
| 3,028,939 | Glick | Apr. 10, 1962 |
| 3,036,562 | Scott | May 29, 1962 |
| 3,049,110 | Kerr | Aug. 14, 1962 |